United States Patent [19]

Giesler

[11] Patent Number: 5,647,398

[45] Date of Patent: Jul. 15, 1997

[54] FLUID COUPLER FOR USE IN THE TRANSFER OF LIQUEFIED GASES

[75] Inventor: Dennis C. Giesler, Maple Grove, Minn.

[73] Assignee: Parker-Hannifin Corporation, Cleveland, Ohio

[21] Appl. No.: 695,259

[22] Filed: Aug. 9, 1996

Related U.S. Application Data

[60] Provisional application No. 60/011,749 Feb. 6, 1996.
[51] Int. Cl.$^6$ ................................. F16L 37/28
[52] U.S. Cl. .............. 137/614.03; 137/614; 137/468; 251/359
[58] Field of Search ................. 137/614.03, 614, 137/468; 251/359

[56] References Cited

U.S. PATENT DOCUMENTS

| 2,304,390 | 12/1942 | Wolfram | 137/614.03 |
| 2,456,045 | 12/1948 | Brock | 137/614.03 |
| 3,621,951 | 11/1971 | Schmid | 137/468 X |

*Primary Examiner*—Kevin Lee
*Attorney, Agent, or Firm*—John A. Molnar

[57] ABSTRACT

A fluid coupler connectable with a fitting of a variety which extends from an externally-threaded forward coupling end to a rearward port end. The coupler includes a body having an internal fluid passageway and valve stem. A distal end of the valve stem has a forward surface defining a seating portion, and a rearward surface engageable with a poppet valve of the fitting. A valve sleeve is received coaxially over the valve stem to define a fluid flow path therebetween. A rearward second end of the valve sleeve defines an outer periphery and an inner periphery configured to be received within the seating portion of the valve stem, and has a rearward confrontation surface with a seal member rotatably received within a mounting groove thereof. The valve sleeve is biased in a rearward first position wherein the second end thereof is received within the seating portion of the valve stem closing the fluid flow path, and is movable to a forward second position opening the fluid flow path. A coupling nut member is mounted over the coupling end of the valve body to be threadably engageable with the coupling end of the fitting for drawing the seal into a fluid-tight adjacency with a land portion of the fitting moving the valve sleeve from the first to second position, and for drawing the rearward surface of the valve stem into an abutting engagement with the poppet valve of the fitting which opens the valve.

20 Claims, 5 Drawing Sheets

FLUID COUPLER FOR USE IN THE TRANSFER OF LIQUEFIED GASES

This is a continuation of Provisional Application Ser. No. 60/011,749, filed Feb. 6, 1996.

BACKGROUND OF THE INVENTION

The present invention relates generally to a fluid coupler member for a fluid conduit, and more particularly to a coupler for a self-sealing coupling assembly especially adapted for use in the transfer of liquefied gases, such as liquid carbon dioxide, from a portable storage vessel to a remote location.

Liquid carbon dioxide ($CO_2$) is utilized by the restaurant industry both as a carbonating agent for soft drink beverages and the like, and to pressurize the vessels in which the beverages are stored and drive the transfer of a medium such as syrup to the dispensers from which the beverages are served. As the restaurant industry has grown, so too has its demand for liquid $CO_2$. Indeed, many restaurants, and especially those of the "fast-food" food variety that must cater to a high volume of customers, have initiated on-site bulk storage of liquid $CO_2$. The liquid typically is trucked in a portable storage vessel for transfer to a tank within the restaurant. A flexible supply line or hose is provided to lead from the supply truck for connection to the tank.

The connection between the supply truck and the tank conventionally is effected via a self-sealing coupling assembly which includes a male fitting member, preferably provided as a nipple or the like which may be stationarily mounted to an exterior bulkhead or other wall of the restaurant for defining an inlet port of the tank, and an corresponding female coupler member which terminates the delivery hose for defining an outlet port thereof, and which is configured for a threaded engagement with the male member. In a common configuration, both the male and female members typically include a poppet valve assembly which is spring-biased to be urged into a normally-closed orientation for preventing the escape of fluid when the coupling members are disconnected. These poppet valve assemblies cooperate, however, to establish an internal fluid flow path as the respective male and female members are operatively engaged.

A representative self-sealing coupling of the type herein involved includes an externally-threaded male nipple member which is provided as having a peripheral flange to facilitate the mounting of the member to a bulkhead or other wall. A corresponding female coupler member is provided as having an internally-threaded nut configured for engagement with the external threads of the nipple member. As the two members are engaged and drawn together via the rotation of the coupler sleeve, a generally annular interface seal of the internal poppet valve assembly of the coupler is made to abuttingly engage a corresponding interface land of the nipple for effecting a fluid-tight seal therebetween prior to the opening of any fluid flow path.

As the rotation of the coupler sleeve onto the external nipple threads is continued, a valve sleeve, to which sleeve the interface seal is bonded, is made to retract into the body of the coupler exposing a coaxially-disposed valve stem and opening the normally-closed poppet valve. The valve stem is configured to abuttingly engage an opposing, normally-closed poppet valve of the nipple for opening that valve. With both poppet valves assemblies actuated into an open orientation, an internal fluid flow path thereby is established through the assembly.

Upon disconnection, with the coupler nut being oppositely rotated along the external threads of the nipple, the coupler valve stem is disengaged from the nipple poppet assembly which again returns to its normally-closed orientation. As the disconnecting rotation of the coupler nut is continued, the coupler valve sleeve is urged again toward a fluid-tight engagement with the valve stem which thereby closes the coupler. Thereupon, with further rotation of the coupler nut, the coupler interface seal is disengaged from the interface land of the nipple to allow for the complete disconnection of the members.

Advantageously, the described engagement facilitates "dry break" connects and disconnects with a minimum of air inclusion or liquid spillage, and operates irrespective of whether either or both members of the coupling are pressurized. Other representative coupling arrangements are illustrated in U.S. Pat. Nos. 2,208,286; 2,254,997; 2,485,006; 2,739,374; 2,821,412; 3,117,592; 4,099,726; 5,248,125; and 5,265,844.

The service demands made on fluid couplings include the capability for rapid connection and disconnection without an appreciable loss of the fluid medium or an ingress of air into the fluid system. Most couplings, moreover, generally must be fluid-tight both while separated and while joined. With respect to applications involving the transfer of liquefied gases, cryogenic liquids, or other sub-freezing fluids, the fluid couplings therefor additionally must cope with the problem of "ice-lock." In this regard, and as is detailed in U.S. Pat. No. 4,462,223, the flow of sub-freezing fluid though a fluid coupling is known to effect a localized cooling of the area surrounding the coupling which condenses and freezes ambient atmospheric moisture. This phenomenon, which is most extreme in humid environments, typically results in a build-up of ice both externally on and internally within the coupling which essentially "locks" the male and female members thereof together to an extent that disconnection requires considerably more torque than normal. Upon the attempted uncoupling of an assembly which is in such a condition, the valve seal of the coupling, which conventionally is bonded to the valve sleeve of the coupler member, has been observed to crack or tear. Ultimately, the fluid integrity of the coupling is affected to an extent that the service life thereof is prematurely shortened.

Moreover, with service temperatures which may fluctuate from ambient to less than $-45°$ F. ($-42°$ C.) in under 5 minutes, differences in the coefficients of thermal expansion as between the seal, bonding adhesive, and fitting body often result in the seal being separated from the valve sleeve. This separation further affects the fluid integrity of the coupling.

In view of the foregoing, it will be appreciated that improvements in the design of coupler members for fluid coupling assemblies adapted for use in applications involving the transfer of liquid $CO_2$ and other sub-freezing liquids would well-received by industry. Especially desired would be a coupler design which is adapted for use with existing nipples, but which is less susceptible to the damaging thermal effects of sub-freezing liquids.

SUMMARY OF THE INVENTION

The present invention is directed to a fluid coupler, and particularly to a coupler member for a coupling assembly which is adapted for use in the transfer of liquefied gases, such as liquid carbon dioxide, from a portable storage vessel to a remote location. The coupler member includes an interface seal member for forming a first fluid-tight seal with an associated fitting member such as a nipple. The interface seal is not bonded to the valve sleeve, but rather is freely rotatably received within a mounting groove which is integrally-formed into the sleeve. In this way, a clutch or slip joint is provided which allows for the breaking of ice which may form between the nipple and the coupler during the transfer of sub-freezing liquids without the tearing of the seal. The freely-rotatable mounting of the interface seal within the mounting groove additional mitigates the damaging thermal expansion effects, including leakage at material interfaces, which have been observed in the coupler members heretofore known in the art.

It therefore is a feature of the present invention to provide a coupler which is connectable in fluid communication with a fitting of a variety which extends from an externally-threaded forward coupling end to a rearward port end. The coupler includes a body having a internal fluid passageway formed therethrough and extending axially along a longitudinal axis from a forward end opening into the passageway to define a first fluid port to a rearward end couplable with the coupling end of the fitting and opening into the passageway to define a second fluid port. A valve stem is internally received within the body to extend from a forward proximal end to a rearward distal end. The distal end has a forward surface configured to define a seating portion, and a rearward surface abuttingly engageable with a poppet valve of the fitting. A generally tubular valve sleeve, which extends between a forward first end and a rearward second end, is received coaxially over the valve stem to define a fluid flow path therebetween through the passageway. The rearward second end of the valve sleeve defines an outer periphery and an inner periphery configured to be received within the seating portion of the valve stem, and has a rearward confrontation surface with a generally annular mounting groove of a select inner and outer diameter integrally-formed therein. A resilient, generally-annular seal member is freely-rotatably received within the mounting groove. The valve sleeve is movable from a rearward first position wherein the second end thereof is received within the seating portion of the valve stem closing the fluid flow path, to a forward second position wherein the second end is spaced apart from the seating portion opening the fluid flow path. A biasing member is interposed between the first end of the valve sleeve and the forward end of the body for normally biasing the valve sleeve in the first position. A coupling nut member is rotatably mounted over the rearward end of the body. The coupling nut member is removably threadably engageable with the coupling end of the fitting to firstly draw the seal member into an abutting, fluid-tight adjacency with a land portion of the fitting moving the valve sleeve from the first to the second position, and to secondly draw the rearward surface of the valve stem into an abutting engagement with the poppet valve of the fitting urging the poppet valve from a forward, closed position to a rearward, open position to thereby establish fluid communication between the fitting and the coupler.

It is a further feature of the invention to provide a coupling assembly for a fluid conduit which includes a fitting member and a coupler member connectable therewith. The fitting member extends from an externally-threaded forward coupling end to a rearward end defining a first fluid port of the coupling assembly, and has an internal poppet valve assembly. The poppet valve assembly is movable from a forward, closed position normally biased against a generally annular valve seat to a rearward, open position spaced apart from the valve seat. The valve seat has a forward interface surface with a generally annular land portion. The coupler member includes a body which has an internal fluid passageway formed therethrough and which extends axially along a longitudinal axis from a forward end opening into the passageway to define a second fluid port of the coupling assembly, to a rearward end couplable with the coupling end of the fitting member and opening into the passageway. A valve stem is internally received within the body to extend from a forward proximal end to a rearward distal end. The distal end has a forward surface configured to define a seating portion, and a rearward surface abuttingly engageable with the poppet valve of the fitting. A generally tubular valve sleeve, which extends from between a forward first end and a rearward second end, is received coaxially over the valve stem to define a fluid flow path therebetween through the passageway. The second end of the valve sleeve defines an outer periphery and an inner periphery which is configured to be received within the seating portion of the valve stem, and has a rearward confrontation surface with a generally annular mounting groove of a select inner and outer diameter integrally-formed therein. A resilient, generally-annular seal member is freely-rotatably received within the mounting groove. The valve sleeve is movable from a rearward first position wherein the second end thereof is received within the seating portion of the valve stem closing the fluid flow path, to a forward second position wherein the second end is spaced apart from the seating portion opening the fluid flow path. A biasing member is interposed between the first end of the valve sleeve and the forward end of the body for normally biasing the valve sleeve in the first position. A coupling nut member is rotatably mounted over the rearward end of the coupler body. The coupling nut member is removably threadably engageable with the coupling end of the fitting member to firstly draw the seal member into an abutting, fluid-tight adjacency with the land portion of the fitting member moving the valve sleeve from the first to the second position, and to secondly draw the rearward surface of the valve stem into an abutting engagement with the poppet valve of the fitting urging the poppet valve from its forward, closed position to its rearward, open position to thereby establish fluid communication between the fitting and coupler members.

Advantages of the present invention include a coupler construction which is adapted for use with existing nipples, and which is resistant to the damaging thermal effects of subfreezing liquids. Additional advantages include a coupler construction which is field repairable, and which provides for an increased interface seal thickness for improved low temperature performance. Further advantages include a coupler design which allows for the free rotating of the interface seal, but which minimizes seal washout, pull-out, and damage from over-tightening of the coupling components. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

The drawings will be described further in connection with the following Detailed Description of the Invention.

DETAILED DESCRIPTION OF THE INVENTION

For the purposes of the discourse to follow, the precepts of the invention herein involved are described in connection with a fluid coupler and coupling assembly particularly adapted for use in the transfer of liquid $CO_2$ or another liquefied gas from a portable storage vessel, which may be transported to a remote location via a deliver or other supply line, into a tank such as may be contained within a restaurant or other establishment for use in beverage dispensing or the like. It will be appreciated, however, that aspects of the present invention may find utility in other fluid transfer systems. Use within those systems therefore should be considered to be expressly within the scope of the present invention.

Figure 2:
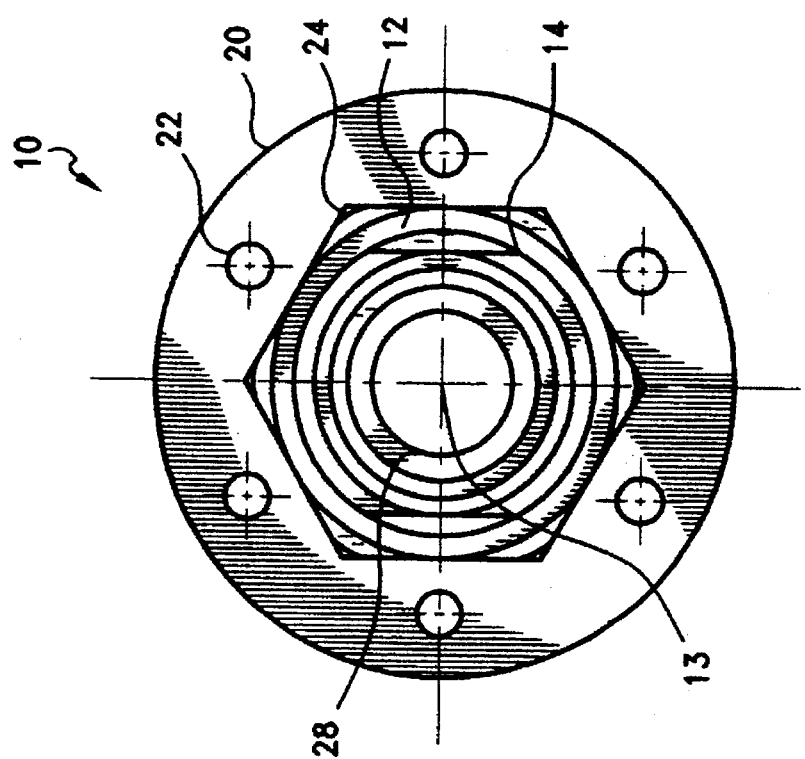
FIG. 2 is a front view of the fitting of FIG. 1.

Referring then to the figures wherein corresponding reference characters are used to designate corresponding elements throughout the several views, shown generally at 10 is a representative male fitting member for use in conjunction with an associated female coupler member of the present invention. Fitting 10, which may be a nipple or the like, is of a variety having a housing, 12, which extends axially along a central longitudinal axis, 13, from an externally-threaded male coupling end, 14, to a rearward port end, 16, which defines a fluid port for fluid connection with a storage tank, other vessel, or the like. As is shown, housing 12 may be provided as being of a two-piece construction with an O-ring or other seal, 18, interposed therebetween for effecting a fluid-tight seal. Housing 12 additionally may be provided as having a flange portion, 20, to facilitate its mounting to an exterior bulkhead or other wall. Looking momentarily to FIG. 2, flange portion 20 may be seen to extend circumferentially about housing 12 and to include a plurality of radially-disposed apertures, one of which is referenced at 22, configured to receive a fastening member such as a screw, bolt, or the like. Housing 12 additionally may be seen in FIG. 2 to be formed as having a hexagonal flats portion, 24, configured for engagement with a wrench or other tool for holding fitting 10 stationary as an associated coupler member (FIG. 3) is rotatably connected thereto.

Returning to FIG. 1, a poppet valve assembly, referenced generally at 26, is shown to be internally received within housing 12 of fitting 10. Poppet valve assembly 26 includes a forward valve head, 28, having a generally annular, beveled surface, 29, and a rearward plunger, 30. Depending upon the compatibility of the fluid medium being handled, surface 29 may be formed of a resilient, elastomeric material such as neoprene or EPDM rubber, or another polymeric material such as polytetrafluoroethylene or an ethylene-propylene blend or copolymer. A spring, 32, coaxially receives plunger 30 for compression between valve head 28 and an inwardly-extending shoulder portion, 34, of fitting housing 12. Valve head 28 is normally urged by spring 32 into a forward, closed position wherein beveled surface 29 is disposed in an abutting, fluid-tight adjacency with a corresponding rearward, generally-annular seating surface, 36, of an inwardly-extending valve seat portion, 38, of housing 12. Valve seat portion additionally is formed as having a forwardly-disposed interface surface, 40, which includes a land portion, 42, Which may be configured as a generally ridge-shaped projection.

Figure 3:
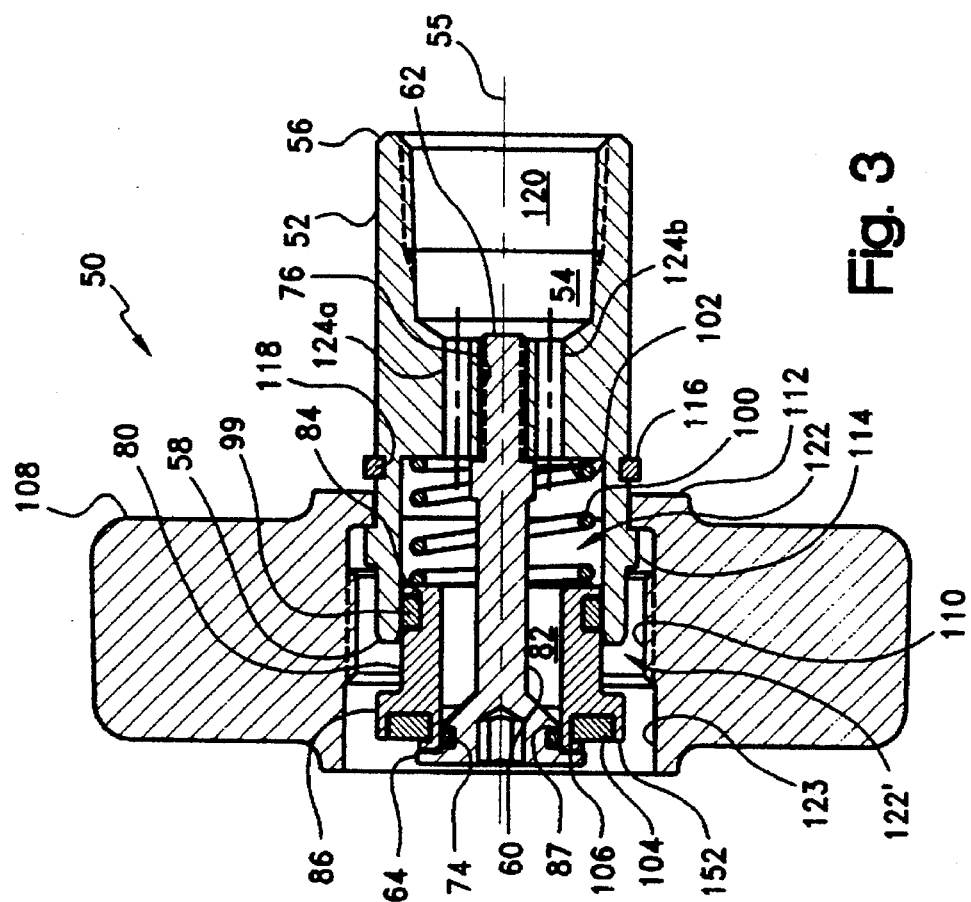
FIG. 3 is a longitudinal cross-sectional view of a fluid coupler according to the present invention adapted for a removable threaded connection with the fitting of FIG. 1.
Figure 1:
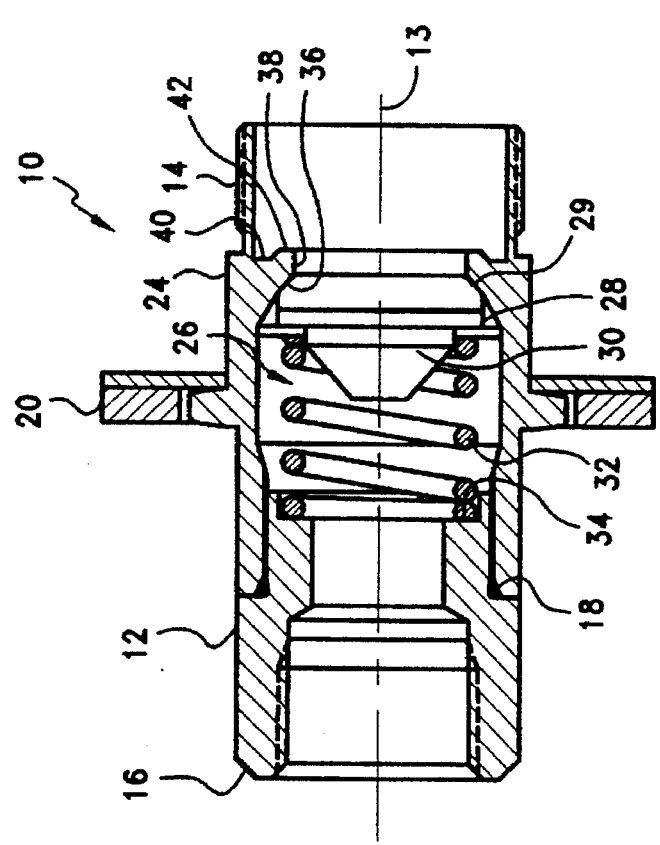
FIG. 1 is a longitudinal cross-sectional view of a fluid fitting for connection with the fluid coupler of the present invention.

Referring next to FIG. 3, a coupler member according to the present invention is shown generally at 50 as configured for a threaded, fluid-tight connection with fitting 10 of FIG. 1. Coupler member 50 includes a generally tubular body, 52, having an internal throughbore or fluid passageway, represented at 54. Body 52 extends axially and generally radially-symmetrically along a longitudinal axis, 55, from a forward end, 56, opening into passageway 54 to define a first fluid port, to a rearward end, 58, also opening into passageway 54 to define a second fluid port and being couplable with the coupling end 14 of fitting 10. An elongate valve stem, 60, is internally received within body 52 to extend from a forward, proximal end, 62, to a rearward, distal end, 64. Also internally disposed within body 52 is generally tubular valve sleeve, 80, which is slidably movably received coaxially over valve stem 60 to define a fluid flow path, shown at 82, therebetween through passageway 54. Valve sleeve 80, in turn, extends between a forward first end, 84, and rearward second end, 86.

Figure 4:
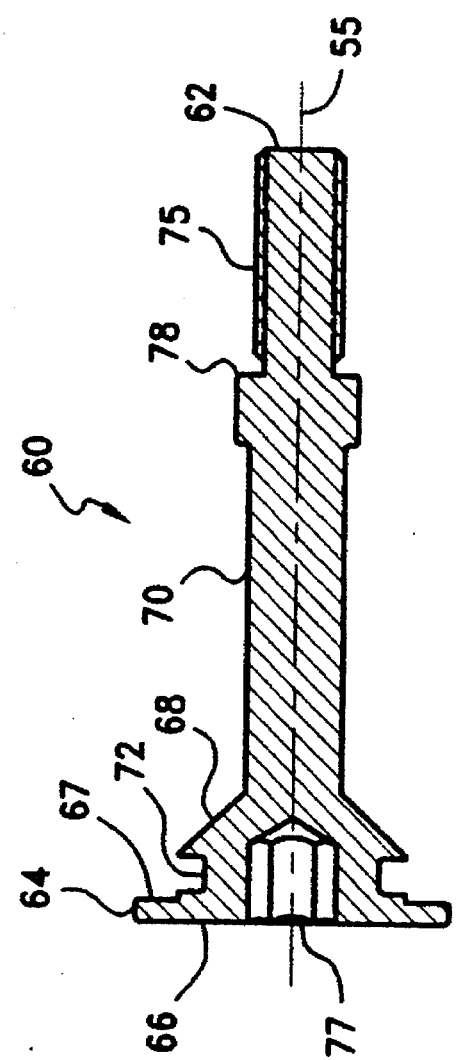
FIG. 4 is an enlarged cross-sectional view illustrating the valve stem of the coupler of FIG. 3 in enhanced detail.

Looking to FIG. 4 wherein stem 60 is shown in enhanced detail, distal end 64 may be seen to include a forward surface, 66, configured to define a seating portion, 67, and a rearward surface, 68, which is abuttingly engageable with valve head 28 of fitting poppet valve assembly 26 (FIG. 1 ). In a preferred embodiment, valve stem 60 is further formed as having a generally cylindrical portion, 70, intermediate distal end forward surface 68 and proximal end 62, and as extending from distal end 66 to cylindrical portion 70 to define a generally frusto-conical forward surface 68 of generally decreasing cross-sectional area for guiding the sliding rearward movement of valve sleeve 80 along valve stem 60. A groove, 72, may be integrally formed about forward surface 68 for receiving an O-ring seal or the like, referenced at 74 in FIG. 3, for effecting a fluid-tight engagement between valve stem distal end 64 and an inner surface, 87, of valve sleeve second end 86. Preferably, and as is shown at 75, valve stem proximal end 62 is externally-threaded for engagement with an internally-threaded bore, shown at 76 in FIG. 3, of body 52. A socket, 77, which may be configured for receiving an Allen-type wrench or the like, may be integrally formed within distal end rearward surface 66 to facilitate the installation of stem 60 within body 52. Further in this regard, cylindrical portion 70 may be formed having a forward terminus configured as a shoulder portion, 78, of an enlarged diameter for providing a position stop delimiting the threaded insertion of valve stem proximal end 62 into bore 76 of body 52.

Figure 5:
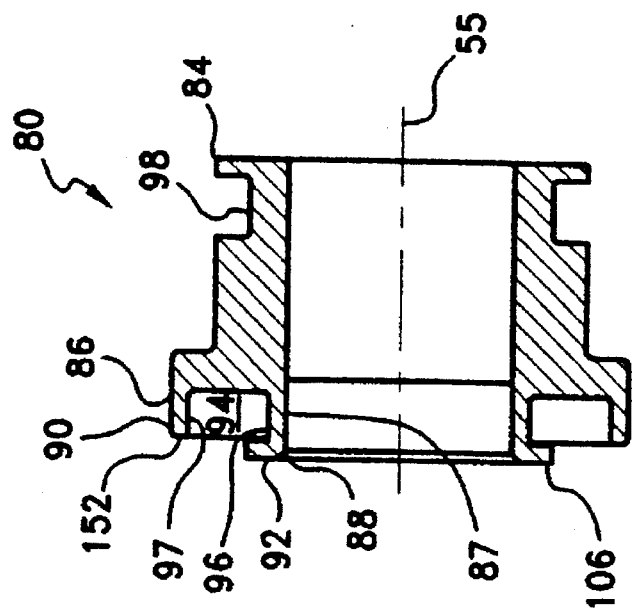
FIG. 5 is an enlarged cross-sectional view illustrating the valve sleeve of the coupler of FIG. 3 in enhanced detail.

Turning next to FIG. 5, wherein valve sleeve 80 is depicted in enhanced detail, rearward second end 86 thereof may be seen to define an outer and an inner periphery, 88 and 90, respectively, the inner periphery being configured to be received within seating portion 67 of valve stem distal end forward surface 66 (FIG. 4). A rearward confrontation surface, 92, of valve sleeve 80 is integrally-formed as having a generally annular mounting groove, 94, of a select inner and an outer diameter, 96 and 97, respectively. Valve sleeve 80 is movable within coupler body 52 from a rearward first position (FIG. 3) wherein second end 86 thereof is received within seating portion 67 closing fluid flow path 82, to a forward second position (FIG. 7) wherein second end 86 is spaced-apart from seating portion 67 opening fluid flow path 82. An outwardly-facing second mounting groove, 98, may be integrally-formed about the outer diameter of valve sleeve first end 84. An O-ring seal or the like, referenced at 99 in FIG. 3, may be received within groove 98 for effecting a fluid-tight seal accommodating the sliding movement of valve sleeve 80 within coupler body 52.

Referring again to FIG. 3, a biasing member, 100, which, as is shown, may be provided as a compressible spring, is interposed between valve sleeve forward first end 84 and forward end 56 of coupler body 52 for normally biasing sleeve 80 in its first position closing fluid flow path 82. In this regard, coupler body 52 preferably is formed as having an internal shoulder portion, 102, which extends radially inwardly into passageway 54 intermediate forward and rearward ends 56 and 58 of body 52. Spring 100 thereby is compressible between shoulder portion 102 and valve sleeve first end 84 by the forward movement of sleeve 80 into its second position opening fluid flow path 82.

As is shown in FIG. 3 at 104, a resilient, generally annular interface seal member, which may be formed of an elastomeric material such as a neoprene rubber or the like, is substantially freely-rotatably received within mounting groove 94 of valve sleeve 80 confrontation surface 92. Interface seal member may have a generally rectangular cross-section, and preferably is provided as having a thickness of at least about ⅛-inch (3 mm). For retaining seal member 104 within groove 94, valve sleeve second end 86 may be formed as having a rearward flange portion, 106. As may be best seen in FIG. 5, flange portion 106 extends radially outwardly about the inner diameter 96 of mounting groove 94 over a portion of seal 104. In this way, the potential "wash-out" of seal 104 from groove 94 is minimized while still allowing for the substantially free rotation of the seal therewithin.

Looking again to FIG. 3, a coupling nut, 108, which may be a hand-tightenable wing nut or the like, is shown to be rotatably mounted over the rearward end 58 of coupler body 52. As is referenced at 110, coupling nut 108 is internally-threaded for a removable engagement with the corresponding, externally-threaded male coupling end 14 of fitting 10 (FIG. 1). For the retention of coupling nut 108 on coupler body 52, nut 108 is formed as including an inwardly-extending, radial end flange, 112. In this regard, flange 112 is received intermediate an external collar, 114, integrally-formed about valve sleeve rearward end 58, and a retaining ring, 116, mounted within a circumferential groove, 118, formed into coupler body 52 intermediate collar 114 and forward end 56.

Figure 6:
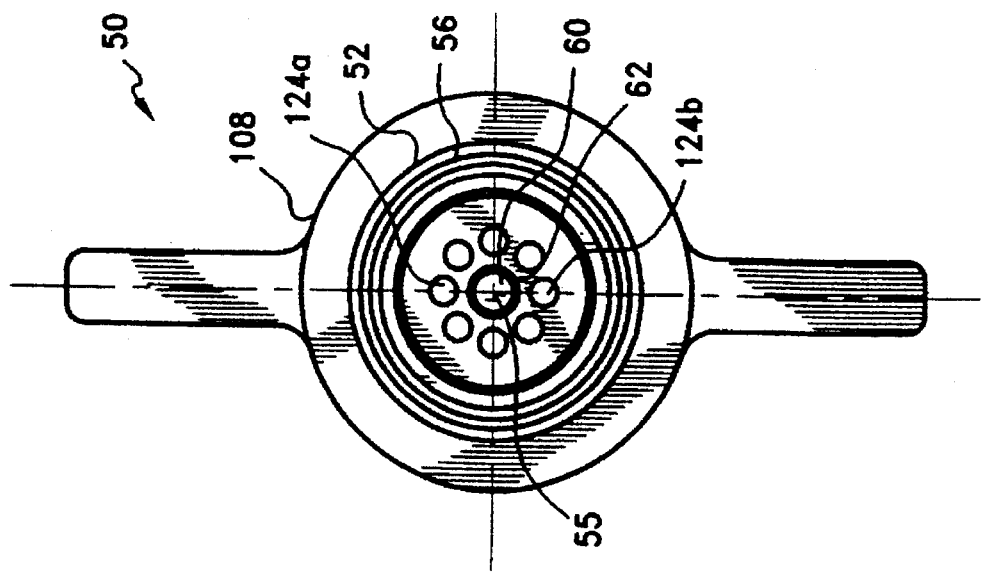
FIG. 6 is a rear view of the coupler of FIG. 3.

In a preferred embodiment, coupler body 52 defines a first internal chamber, 120, opening into forward end 56 for forming the first fluid port of coupler 50, and a second internal chamber, 122, opening into rearward end 58 for defining the second fluid port and for receiving valve sleeve forward end 84 therewithin. As is shown at 123, a portion of coupling nut 108 may be provided to rearwardly extend beyond coupler body rearward end 58 for defining a portion of the second internal chamber which is referenced at 122'. For defining passageway 54 through coupler body 52, first and second internal chambers 120 and 122 are connected in fluid communication by a plurality of throughholes, two of which are referenced at 124a and 124b, integrally-formed within body 52. Looking momentarily to FIG. 6, throughholes 124 may be seen to be spaced radially about the longitudinal axis 55 of body 52. Returning to FIG. 3, with body 52 so configured, threaded proximal end 62 of valve stem 60 may be provided to extend axially along longitudinal axis 55 intermediated throughholes 124.

Figure 7:
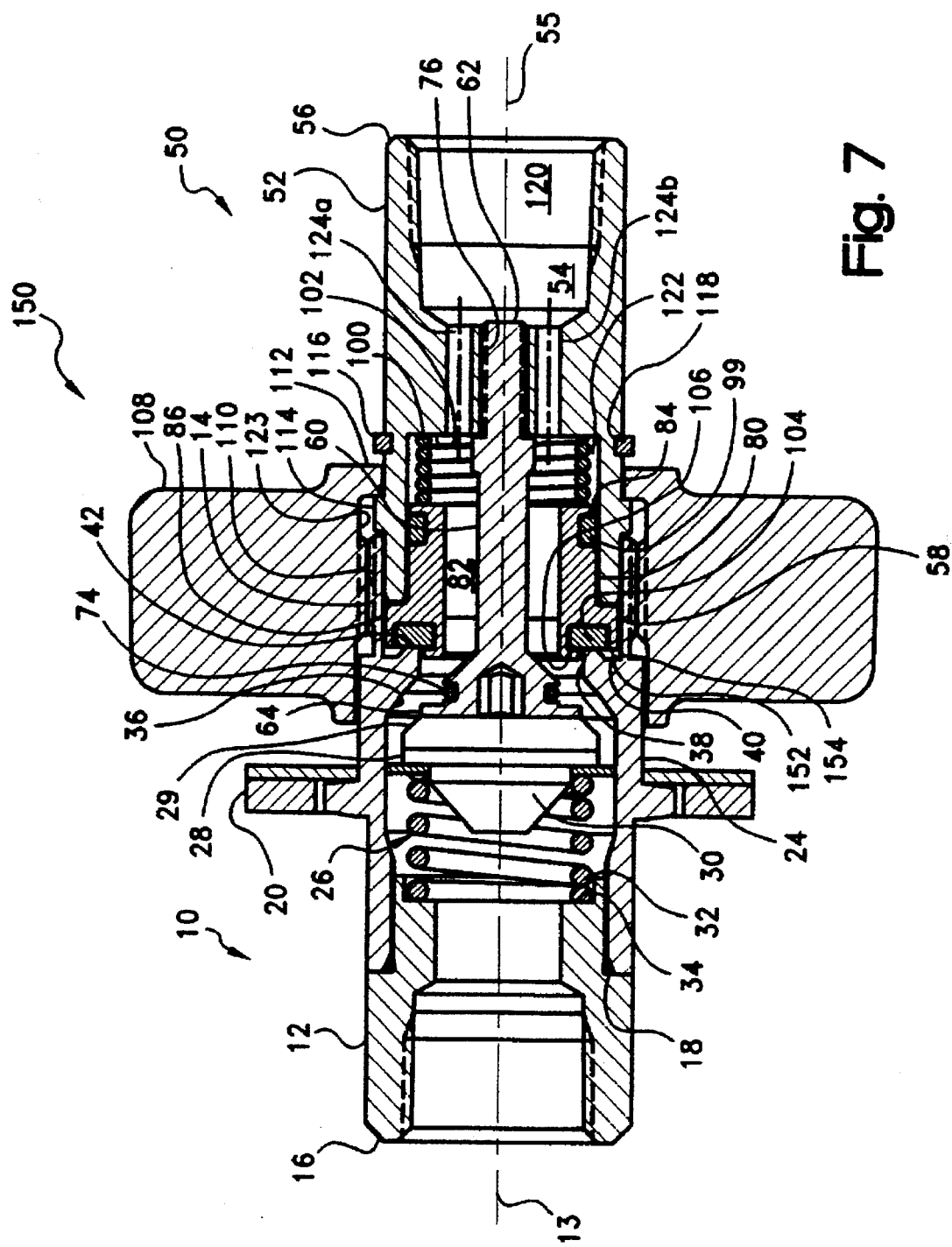
FIG. 7 is a longitudinal cross-section view showing the coupler of FIG. 3 as connected to the fitting of FIG. 1.

Turning next to FIG. 7, fitting member 10 (FIG. 1) and coupler member 50 (FIG. 3) are shown generally at 150 as an assembly connected in fluid communication for completing a fluid conduit such as is used in the transfer of a liquefied gas. In this regard, for the flow of fluid through assembly 150, rearward end 16 of fitting member 10 may be coupled to a fluid storage tank or the like to define an outlet port of the assembly, and forward end 56 of coupling member 50 may be coupled to a supply hose or the like to define an inlet port of the assembly. Alternatively, the fluid flow direction through assembly 150 may be reversed such that fitting rearward end 16 defines the inlet port of the assembly, with coupler forward end 56 defining the outlet port thereof.

Assembly 150 is removably joined via the threaded engagement of coupling nut 108 of coupler member 50 with coupling end 14 of fitting member 10. As the rotation of nut 108 onto end 14 is initiated, coupler interface seal 104 member is firstly drawn into an abutting, fluid-tight adjacency with land portion 42 of fitting member 10. Thus, a fluid-tight seal is effected between the respective members of the assembly prior to the opening of any fluid flow path through any one of the members. Such sealing provides for "dry break" connects and disconnects with a minimum of air inclusion or fluid spillage. Advantageously, outer periphery 90 of coupler sleeve second end 86 and the outer diameter 97 of mounting groove 94 define a stop member, 152, therebetween. It will be appreciated that stop member 152 is abuttingly engageable with interface surface 40 of fitting 10 to delimit the movement of sleeve 60 which otherwise would draw interface seal 104 member further into fitting land portion 42. That is, the bearing of stop member 152 on interface surface 40 functions as a positive stop which protects seal 104 member from being crushed or otherwise damaged should nut 108 be over-tightened.

Moreover, and as is shown at 154, the relatively small normal displacement of stop member 152 from fitting interface surface 40 minimizes the gap between fitting member 10 and coupler member 50 into which interface seal 104 can be extruded. Seal extrusion is further minimized by virtue of seal 104 being retained between valve sleeve rearward flange portion 106 and fitting land portion 42. Flange portion 106 additionally prevents seal 104 from being pulled out of sleeve mounting groove 94 during coupling, especially should the seal be frozen or otherwise attached to land portion 42, and from falling out of groove 94 after uncoupling.

As the rotation of the coupling nut 108 onto fitting coupling end 14 proceeds, coupler valve sleeve 80 is moved from its rearward first position to its forward second position opening fluid flow path 82. Concomitantly with the movement of valve sleeve 80, rearward surface 66 of valve stem 60 is secondly drawn into an abutting engagement with valve head 28 of fitting poppet valve assembly 26 urging it from its forward, normally-closed position to its rearward open position. With the fluid flow paths of both the fitting and coupler members being opened, fluid communication therebetween is established, in series, through coupler forward end 56, second chamber 122, throughholes 124, spring 100, and flow path 82, and through fitting coupling end 14, poppet valve assembly 26, and rearward port end 16. Upon disconnection, the coupling sequence is reversed with fitting poppet valve assembly 26 and coupler valve sleeve 80 being respectively returned to their normally-closed positions with coupler interface seal 104 lastly being withdrawn from abutting, fluid-tight adjacency with land portion 42 of fitting member 10 to provide a "dry break" disconnect with a minimum of fluid loss.

As was aforementioned, in service, fitting 10 and coupler 50 may become frozen together during the transfer of sub-freezing liquids such as liquid $CO_2$. Specifically, coupler valve sleeve 80 may become frozen to coupler body 52 such that the sleeve is no longer freely rotatable within chamber 122 to provide a clutch or slip joint between fitting 10 and coupler 50. In this regard, however, interface seal 104 is not bonded to valve sleeve 80. Rather, the seal is freely rotatably received within mounting groove 94 which is integrally-formed into second end 86 of sleeve 80. In this way, it will be appreciated that another clutch or slip joint is provided which allows for the breaking of the ice which may have formed between the members without the tearing of seal 104. The freely-rotatable mounting of interface seal 104 within mounting groove 94 additionally mitigates the damaging thermal expansion-induced effects, including seal delamination and resultant interface leakage, which have been observed in the coupler members heretofore known in the art.

Figure 8:
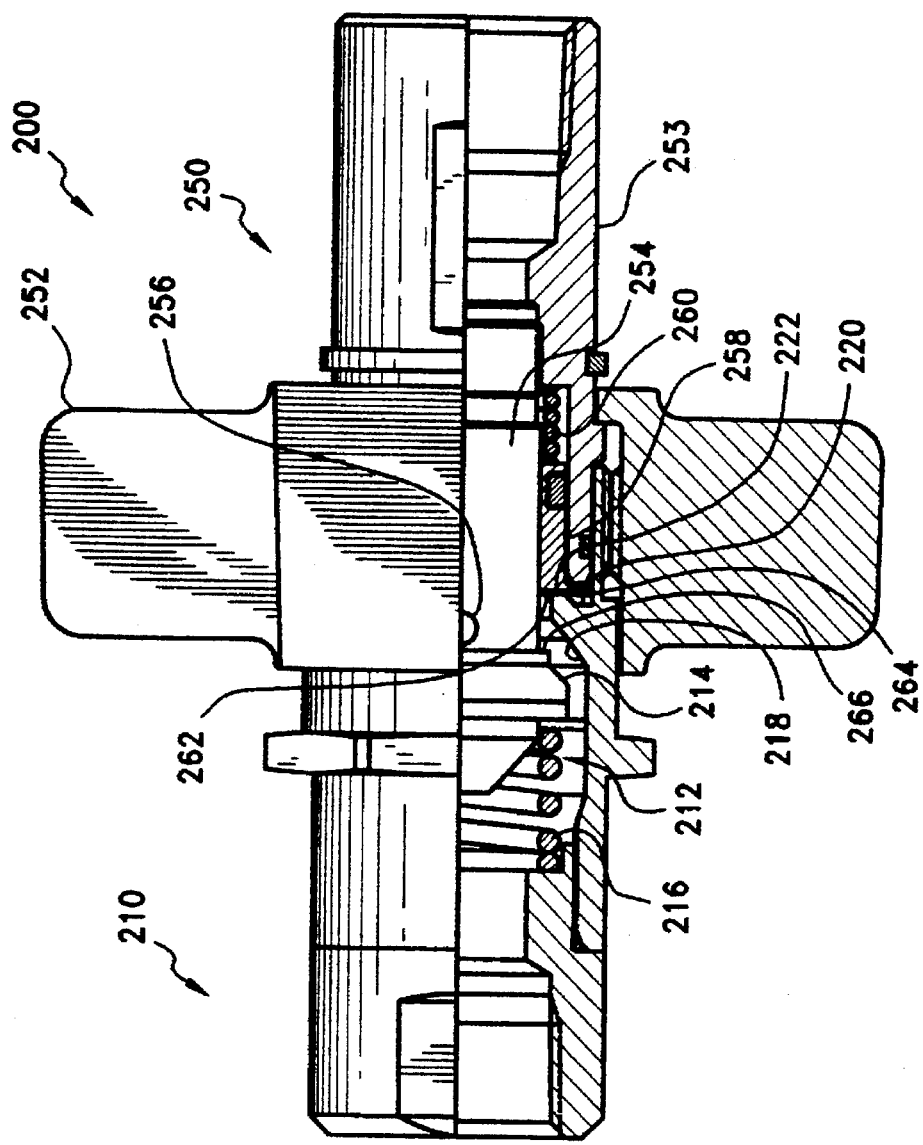
FIG. 8 is a longitudinal, partially cross-sectional view showing a coupling assembly according to the prior art.

For purposes of comparison, a coupling assembly constructed generally in accordance with the prior art is shown in FIG. 8 generally at 200. Assembly 200 includes a male fitting member, 210, and a female coupler member, 250. Fitting 210 includes a poppet valve assembly 212 having a forward valve head, 214, which is normally urged by spring, 216, into an abutting, fluid-tight adjacency with a valve seat, 218. Valve seat 218 additionally is formed as having a forwardly-disposed interface surface, 220, which includes a land portion, 222.

Associated coupler member 250 includes a coupling nut, 252, configured for a threaded engagement with a corresponding end of fitting member 210, an elongate body, 253, and a generally tubular valve stem, 254, which is received within body 253 and which defines an internal fluid flow path with at least one outlet port, 256. Port 256 is normally closed by a valve sleeve, 258, which is slidably received over stem 254 as biased by a spring, 260. A rearward surface, 262, of valve sleeve 258 is presented toward fitting interface surface 220, and has bonded thereto a relatively flat seal, 264, for effecting a fluid-tight engagement with fitting land portion 222. Seal 264 additionally effects a fluid-tight engagement with a rearward surface, 266, of valve stem 254 closing the fluid flow path therethrough when fitting member 210 and coupler member 250 are uncoupled.

It will be appreciated, however, that with seal 264 being bonded to coupler surface 262 with an adhesive or the like, no clutch or slip joint is provided between fitting member 210 and coupler member 250 if sleeve 258 should become frozen to coupler body 253. Thus, seals of such type have been observed to tear upon the attempted uncoupling of an "ice-locked" assembly. Differences in the coefficients of expansion as between the seal, adhesive, and coupler surface also contribute to the delamination of the seal. With either occurrence, the fluid integrity of the coupling is ultimately affected, a problem which is compounded by the fact that the damage is not easily repaired in the field. Consequently, the service life of the coupling often is prematurely shortened. Additionally, as compared to the design illustrative of the prior art, the coupler construction of the present invention provides for an increased interface seal thickness with an attendant improvement in improved low temperature performance.

Thus, a unique coupler member construction is described herein which accommodates for the damaging thermal effects heretofore associated with the handling of sub-freezing liquids. Such construction additionally is adapted for use with existing fittings, is field repairable, and allows for proper operation irrespective of whether neither, either, or both the coupler and fitting members are pressurized.

Materials of construction for fitting member 10 and coupling member 50 are considered conventional for the uses involved. For forming the bodies and valving components, such materials generally will be corrosion resistant, but specifically will depend upon the fluid or fluids being handled. A metal material such as a mild or stainless steel is preferred for durability. As aforementioned, the seals and other fluid-tight bearing surfaces preferably are formed of an elastomeric material such as neoprene of EPDM rubber, or another polymeric material such as polytetrafluoroethylene or an ethylene-propylene blend or copolymer. Other types of rubber such as nitrile or butyl rubber, or another polymeric material such as a polytetrafluoroethylene or the like may be substituted, however, again as selected for compatibility with the fluid being transferred.

As it is anticipated that certain changes may be made in the present invention without departing from the precepts herein involved, it is intended that all matter contained in the foregoing description shall be interpreted in as illustrative rather than in a limiting sense. All references cited herein are expressly incorporated by reference.

What is claimed:

1. A coupler connectable in fluid communication with a fitting of a variety which extends from an externally-threaded forward coupling end to a rearward port end, and which has an internal poppet valve assembly movable from a forward, closed position normally biased against a generally annular valve seat to a rearward, open position spaced apart from the valve seat, the valve seat having a forward interface surface with a generally annular land, and said coupler comprising:

a body having an internal fluid passageway formed therethrough and extending axially along a longitudinal axis from a forward end opening into said passageway to define a first fluid port to a rearward end couplable with the coupling end of the fitting and opening into said passageway to define a second fluid port;

a valve stem internally received within said body to extend from a forward proximal end to a rearward distal end, said distal end having a forward surface configured to define a seating portion, and a rearward surface abuttingly engageable with the poppet valve of the fitting;

a generally tubular valve sleeve received coaxially over said valve stem to define a fluid flow path therebetween through said passageway and extending between a forward first end and a rearward second end, said second end defining an outer periphery and an inner periphery configured to be received within said seating portion of said valve stem and having a rearward confrontation surface with a generally annular mounting groove of a select inner and outer diameter integrally-formed therein, and said valve sleeve being movable from a rearward first position wherein said second end thereof is received within said seating portion closing said fluid flow path, to a forward second position wherein said second end is spaced apart from said seating portion opening said fluid flow path;

a resilient, generally-annular first seal member freely-rotatably received within said mounting groove;

a biasing member interposed between the first end of said valve sleeve and the forward end of said body for normally biasing said the valve sleeve in said first position; and a coupling nut member rotatably mounted over the rearward end of said body, said coupling nut member being removably threadably engageable with the coupling end of the fitting to firstly draw said first seal member into an abutting, fluid-tight adjacency with the land portion of the fitting moving said valve sleeve from said first to said second position and to secondly draw said rearward surface of said valve stem into an abutting engagement with the poppet valve of the fitting urging the poppet valve from its forward, closed position to its rearward, open position to thereby establish fluid communication between the fitting and said coupler.

2. The coupler of claim 1 wherein the second end of said valve sleeve is formed as having a rearward flange portion which extends radially outwardly about the inner diameter of said mounting groove over a portion of said first seal for retaining said seal within said mounting groove.

3. The coupler of claim 1 wherein the outer periphery of the second end of said valve sleeve and the outer diameter of said mounting groove define a stop member therebetween, said stop member being abuttingly engageable with the interface surface of the fitting to delimit the movement of said valve sleeve drawing said first seal member further into the land portion of the fitting.

4. The coupler of claim 1 wherein said body has an internal shoulder portion which extends radially inwardly into said passageway intermediate the forward and rearward ends of said body, and wherein said biasing member is a spring which is disposed intermediate said shoulder portion and the first end of said sleeve for compression therebetween by the forward movement of said sleeve.

5. The coupler of claim 1 wherein said valve stem is formed as having a generally cylindrical portion which extends intermediate said distal end forward surface and said proximal end.

6. The coupler of claim 5 wherein said valve stem extends from said distal end to said cylindrical portion to define a generally frusto-conical said forward surface of decreasing cross-sectional area.

7. The coupler of claim 1 further comprising a resilient, generally-annular second seal member received about said valve stem distal end forward surface for effecting a fluid-tight engagement between said valve stem distal end and said second end of said valve sleeve.

8. The coupler of claim 1 wherein said body defines a first internal chamber opening into the forward end of said body for defining said fluid inlet, and a second internal chamber opening into the rearward end of said body for receiving said valve sleeve, said first and second internal chambers being connected in fluid communication to define said passageway by a plurality of axial throughholes integrally-formed within said body and spaced radially about said longitudinal axis.

9. The coupler of claim 8 wherein the proximal end of said valve stem extends axially along said longitudinal axis intermediate said throughholes.

10. The coupler of claim 9 wherein the proximal end of said valve stem is threadably engaged with said body.

11. A coupling assembly for a fluid conduit comprising:
a fitting member extending from an externally-threaded forward coupling end to a rearward port end defining a first fluid port of said coupling assembly, and having an internal poppet valve assembly movable from a forward, closed position normally biased against a generally annular valve seat to a rearward, open position spaced apart from said valve seat, said valve seat having a forward interface surface with a generally annular land; and a coupler member connectable with said fitting member and comprising:
a body having an internal fluid passageway formed therethrough and extending axially along a longitudinal axis from a forward end opening into said passageway to define a second fluid port of said coupling assembly, to a rearward end couplable with said coupling end of said fitting member and opening into said passageway;
a valve stem internally received within said body to extend from a forward proximal end to a rearward distal end, said distal end having a forward surface configured to define a seating portion, and a rearward surface abuttingly engageable with the poppet valve of the fitting;
a generally tubular valve sleeve received coaxially over said valve stem to define a fluid flow path therebetween through said passageway and extending between a forward first end and a rearward second end, said second end defining an outer periphery and an inner periphery configured to be received within said seating portion of said valve stem and having a rearward confrontation surface with a generally annular mounting groove of a select inner and outer diameter integrally-formed therein, and said valve sleeve being movable from a rearward first position wherein said second end thereof is received within said seating portion closing said fluid flow path, to a forward second position wherein said second end is spaced apart from said seating portion opening said fluid flow path;
a resilient, generally-annular first seal member freely-rotatably received within said mounting groove;
a biasing member interposed between the first end of said valve sleeve and the forward end of said body for normally biasing said the valve sleeve in said first position; and
a coupling nut rotatably mounted over the rearward end of said body, said coupling nut member being removably threadably engageable with said coupling end of said fitting member to firstly draw said first seal member into an abutting, fluid-tight adjacency with the land portion of said fitting member moving said valve sleeve from said first to said second position and to secondly draw said rearward surface of said valve stem into an abutting engagement with said poppet valve of said fitting urging said poppet valve from its forward, closed position to its rearward, open position to thereby establish fluid communication between said fitting and coupler members.

12. The assembly of claim 11 wherein the second end of said valve sleeve of said coupler member is formed as having a rearward flange portion which extends radially outwardly about the inner diameter of said mounting groove over a portion of said first seal for retaining said seal within said mounting groove.

13. The assembly of claim 11 wherein the outer periphery of the second end of said valve sleeve and the outer diameter of said mounting groove of said coupler member define a stop member therebetween, said stop member being abuttingly engageable with the interface surface of the fitting to delimit the movement of said valve sleeve drawing said first seal member further into the land portion of the fitting.

14. The assembly of claim 11 wherein said body of said coupler member has an internal shoulder portion which extends radially inwardly into said passageway intermediate the forward and rearward ends of said body, and wherein said biasing member is a spring which is disposed intermediate said shoulder portion and the first end of said sleeve for compression therebetween by the forward movement of said sleeve.

15. The assembly of claim 11 wherein said valve stem of said coupler member is formed as having a generally cylindrical portion which extends intermediate said distal end forward surface and said proximal end.

16. The assembly of claim 15 wherein said valve stem extends from said distal end to said cylindrical portion to define a generally frusto-conical said forward surface of decreasing cross-sectional area.

17. The assembly of claim 11 wherein said coupler member further comprises a resilient, generally-annular second seal member received about said valve stem distal end forward surface for effecting a fluid-tight engagement between said valve stem distal end and said second end of said valve sleeve.

18. The assembly of claim 11 wherein said body of said coupler member defines a first internal chamber opening into the forward end of said body for defining said fluid inlet, and a second internal chamber opening into the rearward end of said body for receiving said valve sleeve, said first and second internal chambers being connected in fluid communication to define said passageway by a plurality of axial throughholes integrally-formed within said body and spaced radially about said longitudinal axis.

19. The assembly of claim 18 wherein the proximal end of said valve stem of said coupler member extends axially along said longitudinal axis intermediate said throughholes.

20. The assembly of claim 19 wherein the proximal end of said valve stem is threadably engaged with said body.

* * * * *